No. 608,930. Patented Aug. 9, 1898.
L. A. TUELL.
COMPARTMENT BAKING PAN.
(Application filed July 17, 1897.)

(No Model.)

WITNESSES:
Wm H Payne
B. E. Doll

INVENTOR
Lydia A. Tuell,
BY E. Silvius,
ATTORNEY.

UNITED STATES PATENT OFFICE.

LYDIA A. TUELL, OF CHICAGO, ILLINOIS.

COMPARTMENT BAKING-PAN.

SPECIFICATION forming part of Letters Patent No. 608,930, dated August 9, 1898.

Application filed July 17, 1897. Serial No. 644,900. (No model.)

*To all whom it may concern:*

Be it known that I, LYDIA A. TUELL, a citizen of the United States, residing at Chicago, in the county of Cook and State of Illinois, have invented certain new and useful Improvements in Compartment Baking-Pans; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to a device used by bakers and housekeepers in which bread or cakes are baked in ovens; and it consists in a pan or mold having compartments and other peculiar and novel features embodied in the details of construction, as will be more fully described hereinafter and pointed out in the claims.

The object of my invention is to provide a pan in which loaves of bread or cake may be baked so as to present nicely-formed full edges and of uniform size of loaf, so that when cut into slices for use the usually ragged and ill-shaped edges are prevented.

A further object is to provide for baking thoroughly all around the loaf.

A still further object is that when desired one, two, or more loaves of a kind and other loaves of another kind of bread or cake may be baked at the same time in the various compartments.

While embodying all these advantages my pan is, furthermore, easily cleansed, is cheaply manufactured, and is durable and economical in use.

Figure 1:
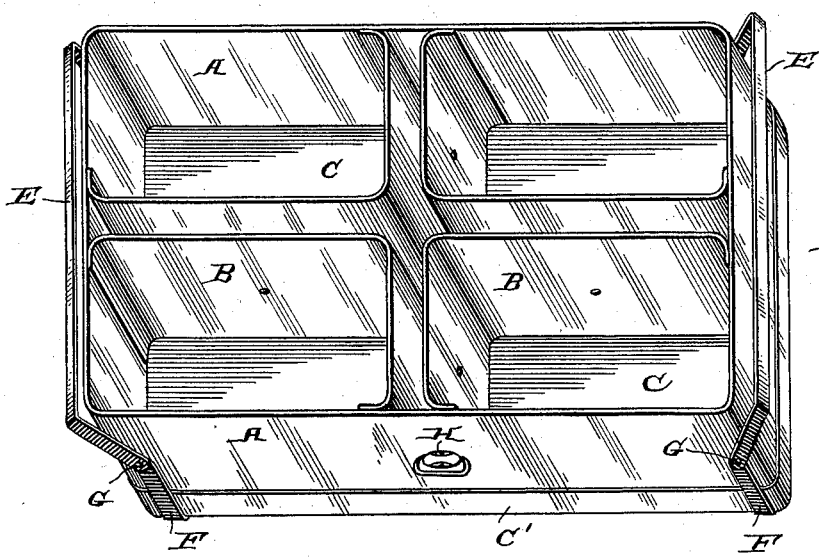
Figure 2:
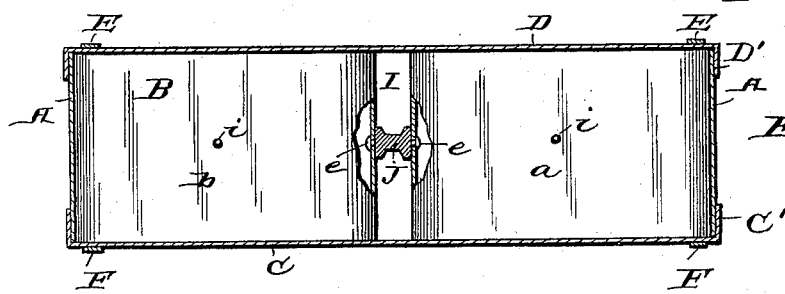
Figure 3:
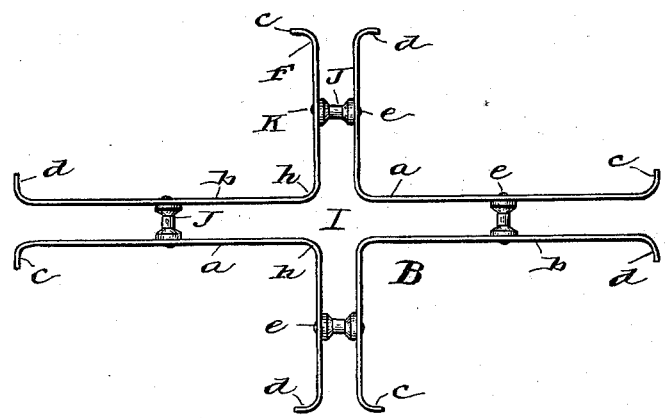

Referring to the drawings, Figure 1 represents a perspective view in which the top is removed, exposing the interior partitions forming the compartments; Fig. 2, a longitudinal central sectional view in which a portion of the partition is broken away on a line coinciding with K, Fig. 3, exposing the securing-stud; and Fig. 3 is a plan view of the partitions.

In the drawings, A designates the sides or frame of the pan; B, the partitions; C, the bottom; D, the top; E E, the top-clamps; F F, the bottom-clamps, and H the handle attached to the front.

In constructing my pan or mold I use any suitable material, such as heavy tin-plate, which may be reinforced and have beaded edges, or in some cases I may use galvanized iron or thin bright steel-plate for the frame and body parts, while the clamps are suitably made of flat hoop-iron or steel. The frame A is made of a continuous piece bent to the proper shape, having slightly-rounded corners, and the two ends brought together and secured in any suitable manner. The handle H is made of any suitable material and is secured to the frame by rivets or by soldering. The top D and bottom C are interchangeable, being made exactly alike, each having a flange D' and C' turned down all around the edges, so as to embrace the frame. The clamps E and F are suitably formed to pass over the top and bottom, respectively, have a suitable pivot-hole at each end, and are secured to the frame by pivotal rivets G. In designing the clamps they are formed so as to pass loosely at the corners over the top, while the central portion is slightly bent down, so that when in position to hold the top and bottom the central portion presses against the top or bottom. This prevents rattling when the pan is empty, but is unnecessary after the bread has risen and presses outward against the bottom and top, which forces them against the clamps. The bread is thus restrained from rising excessively and flowing over the sides, as happens in open pans.

The partitions are composed of four pieces; but any suitable greater number may be used if additional compartments are desired. Each piece $a$ and $b$ is formed of sheet metal of the same width as the frame A and is bent at right angles, having slightly-rounded corners $h$. The ends $c$ and $d$ are turned over at right angles to form a foot, the corner $f$ being also slightly rounded. The four pieces are placed in reversed positions, as shown in Fig. 3, slightly separated, so as to leave an open space I between. Each part of the partition is provided with rivet-holes $i$, into which is inserted the rivet ends $e$ of the studs J, which are made of any suitable design, and the ends riveted, thus securing the four parts together and forming complete partitions. The space I is especially provided so that the heat may circulate around the inner sides of each loaf. The feet $d$ serve to prevent the partitions from being forced out of position when placing dough into one of the compartments while the others are empty and also provides the rounded corners, which are desirable to avoid sharp angles, into which the dough is inclined to stick and break off when removing the loaves. It is obvious that when cleansing the pan both the top and bottom, as well as the partitions, may be removed and readily exposed in all parts for cleansing.

In practical use the bottom is placed over the frame, and the clamps F F placed in position, securing the bottom to the frame. The partitions are then placed in the frame, and after filling the compartments the top is placed in position over the frame and the clamps E E brought over the ends, thus holding the top securely to the frame. The pan may then be placed in the oven, and should the heat be unequally distributed in the oven the pan may be turned end for end or upside down, so as to secure the most favorable effect of the heat.

Having thus described my invention, what I claim, and desire to secure by Letters Patent, is—

1. In a baking-pan, the combination of the body portion comprising the sides and ends, the removable bottom and the removable top, clamps whereby said bottom and said top are secured so as to permit the pan to be placed either bottom down or top down while baking, removable connected partitions extending from bottom to top within said body and so formed and permanently attached together as to provide compartments having heat-passages between, said partitions being provided with turned ends forming feet or braces against the side of said body, substantially as shown and described.

2. The combination of the body portion, the clamps pivotally secured thereto, the removable bottom and the removable top secured by said clamps, removable partitions within said body and so situated relatively to each other as to provide circulating-spaces for heat between them, and suitable means by which said partitions are secured to each other, substantially as shown and described.

3. In a baking-pan, the combination of the body, the removable bottom and removable top each having a flange turned down over said body, the removable partitions formed of like pieces part of which are reversed, and all secured together to form a practically single piece, but slightly separated so as to provide air-passages between said pieces, and the clamps by which said top and bottom are secured to said body, substantially as shown and described.

4. In a baking-pan, the combination with a body having a suitable bottom, of the removable partitions B provided with the feet $c\ d$ and having the space I between the several parts thereof, substantially as shown and described.

In testimony whereof I affix my signature in presence of two witnesses.

LYDIA A. TUELL.

Witnesses:
P. M. RILEY,
Mrs. P. M. RILEY.